Nov. 25, 1924.

O. W. McKNIGHT

SPUR FORMING MACHINE

Filed Aug. 4, 1921

Inventor
Oscar W. McKnight
By C. Shepherd
Attorney

Nov. 25, 1924.
O. W. McKNIGHT
1,517,084
SPUR FORMING MACHINE
Filed Aug. 4, 1921  3 Sheets-Sheet 2
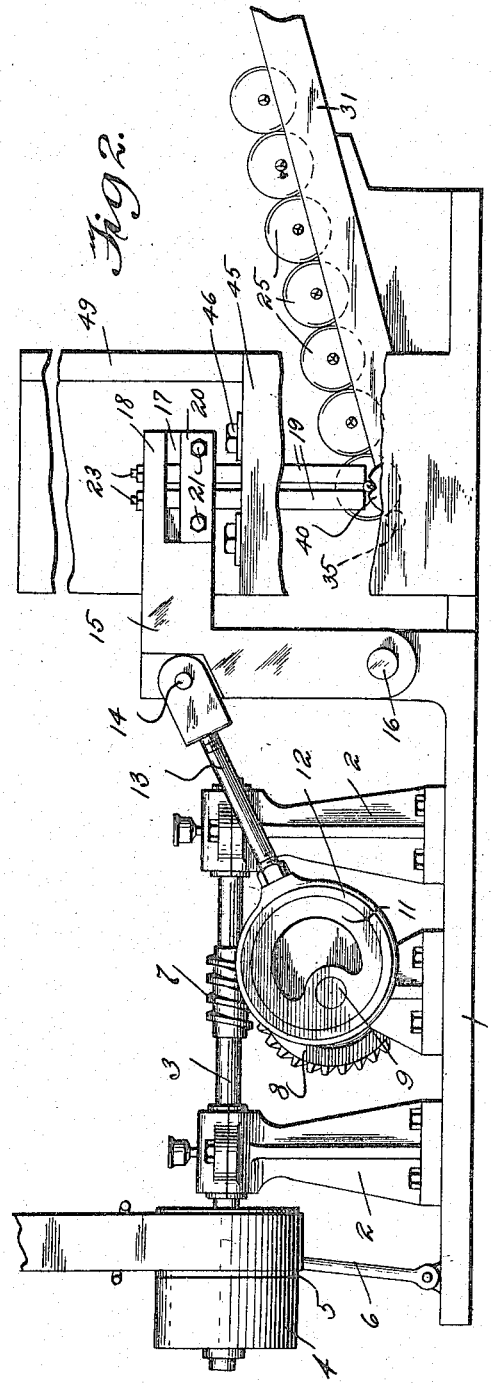
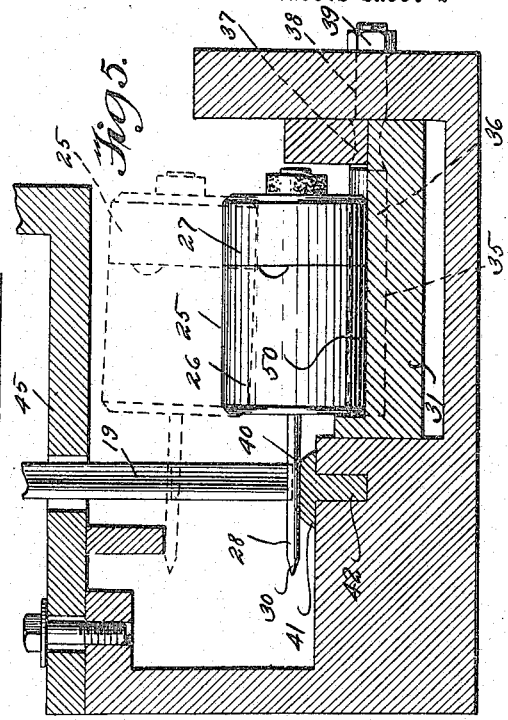
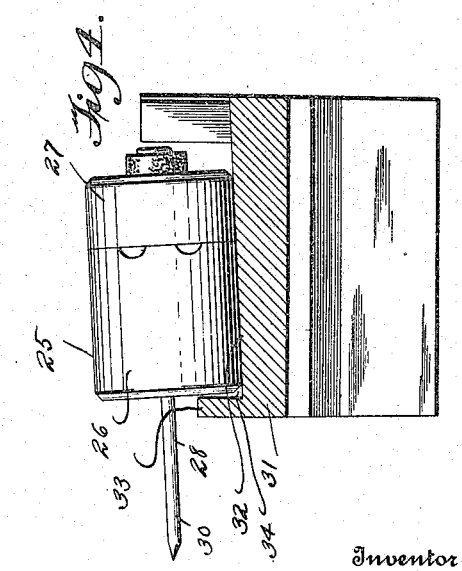
Inventor
Oscar W. McKnight.
By C. C. Shepherd.
Attorney Nov. 25, 1924.                                             1,517,084
               O. W. McKNIGHT
              SPUR FORMING MACHINE
           Filed Aug. 4, 1921         3 Sheets-Sheet 3
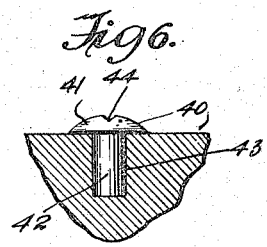
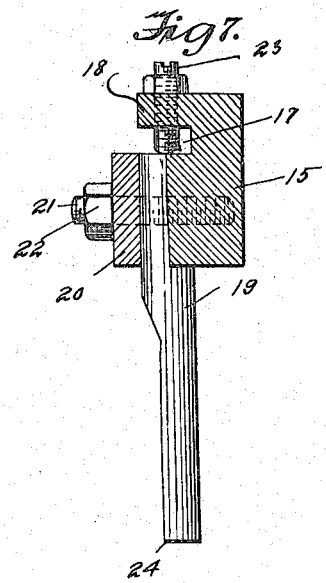
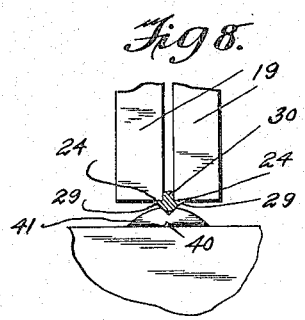
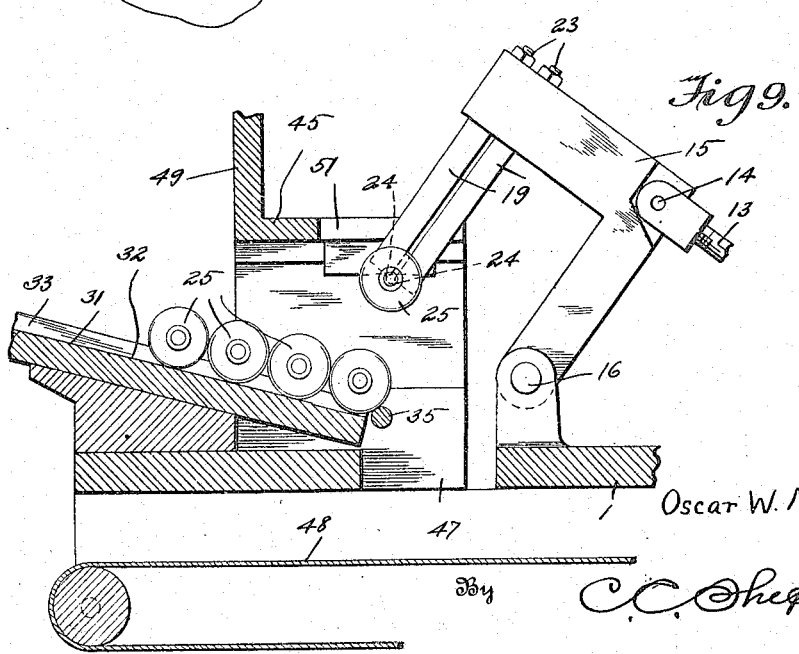
Inventor
Oscar W. McKnight.
By C. C. Shepherd
        Attorney Patented Nov. 25, 1924.

1,517,084

UNITED STATES PATENT OFFICE.

OSCAR W. McKNIGHT, OF COLUMBUS, OHIO, ASSIGNOR TO THE BRUNT TILE AND PORCELAIN COMPANY, OF COLUMBUS, OHIO, A CORPORATION OF OHIO.

SPUR-FORMING MACHINE.

Application filed August 4, 1921. Serial No. 489,703.

*To all whom it may concern:*

Be it known that OSCAR W. McKNIGHT, a citizen of the United States, residing at Columbus, in the county of Franklin and State of Ohio, has invented certain new and useful Improvements in Spur-Forming Machines, of which the following is a specification.

This invention relates to an improved machine for forming spurs or other similar offset projections upon the shanks of securing devices which may be employed for the purpose of connecting the separable sections of porcelain insulator knobs, in order that the said devices may serve, after the formation of the spurs, to prevent undue separation of the sections, so that the knobs as a whole may be kept in an intact and assembled condition suitable for commercial handling.

Another object of the invention resides in the provision of a machine of this nature which will constitute an improvement upon the structure disclosed in my prior Patent No. 1,314,682, issued Sept. 2, 1919, by the provision of a machine wherein the knobs, together with their securing devices, may be automatically fed into the machine into spur forming engagement with movable dies, in order to eliminate the necessity of manually inserting and removing each knob as is the case in my aforesaid patented structure, the automatic feeding of the knobs serving to provide a machine which will have a comparatively large output and an increased capacity for handling knobs and wherein the element of physical injury to the operator thereof will be eliminated.

In carrying out the invention, there is provided a machine wherein is included an inclined table capable of receiving the knobs and their associated fastening devices, the construction of the table being such that the knobs will gravitate downwardly thereof in a predetermined path, the downward movement of such knobs will be limited by means of an adjustable stop member, which acts to engage each of the knobs so that the securing devices thereof will be positioned in registration with an anvil element, and to provide the machine with an oscillatory die holder which is adapted to carry a pair of slightly spaced die members, the movement of the machine being so timed that when a securing device is in registration with the anvil element, the holder will be rocked so that the die members thereof will engage with the securing device so as to produce spurs or integral offsets on the shank thereof. The die members are formed to be slightly resilient, in order that when the same are forced into engagement with a securing device, the latter will be gripped between the members, whereby upon the return of the holder to the initial position, the securing device together with the knob sections will be lifted off of the inclined table and out of engagement with the adjustable stop member, whereby upon further movement of the holder, the knob will be brought into engagement with a stationary abutment, so that the securing devices thereof may be released from engagement with the oscillating die members. Upon the release of the knob, the latter will be permitted to drop by gravity from the discharge portion of the machine and may be received upon a traveling conveyor in order that the knob may be transferred to a convenient point of collection.

For a further understanding of the invention, reference is to be had to the following description and to the accompanying drawing, in which similar characters of reference denote like and corresponding parts throughout the several views thereof.

In said drawings:

Figure 2 is a similar view looking toward the opposite side of the machine.

Figure 4 is a detail transverse sectional view taken on the line 4—4 of Figure 3, and disclosing more particularly the cross sectional formation of the inclined table.

Figure 5 is a similar view taken on the line 5—5 of Figure 3, and disclosing more particularly the formation of the lower end of the table, the anvil element and the adjustable stop member.

Figure 6 is a sectional view showing in detail the construction of the anvil element.

Figure 7 is a detail sectional view taken through the die holder and the spur forming dies carried thereby.

Figure 8 is a detail view disclosing the die members in a spur producing position with respect to the shank of a securing device of a porcelain insulator knob, and Figure 9 is a similar view disclosing the construction whereby the knob is released from engagement with the die members.

Figure 1:
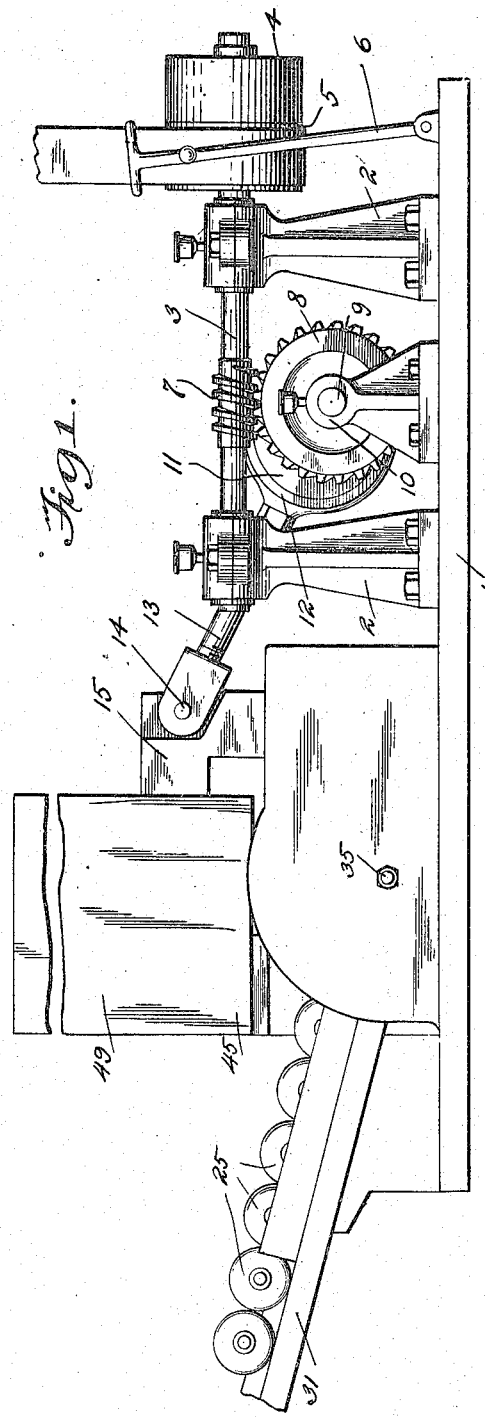
Figure 1 is a side elevation of the improved spur forming machine comprising the present invention.
Figure 3:
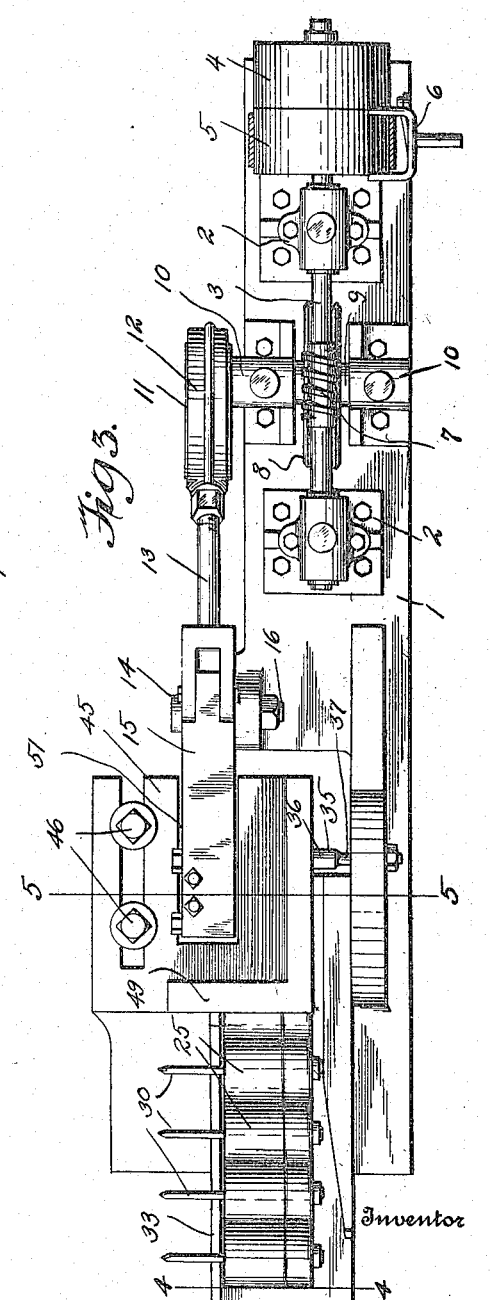
Figure 3 is a top plan view.

Referring more particularly to the details of the invention, the improved spur forming machine comprising the present invention is formed to include a bed frame 1, preferably of cast metal. The rear end of this frame is provided with a pair of upstanding bearings 2, in which is journaled the longitudinally extending power shaft 3 of the machine. This shaft carries at one end the usual loose and fixed pulleys 4 and 5 respectively, around which the drive belt of the machine is adapted to pass. A pivoted belt shifting device 6 being employed in conjunction with the frame 1 for the purpose of conveniently effecting the transfer of the belt from one of the pulleys to the other. The shaft 3 carries, in this instance, at a point between the bearings 2, a fixed worm 7, which is so situated as to mesh with a worm gear 8 carried upon a transversely extending shaft 9. This latter shaft is rotatably carried within bearings 10 provided in conjunction with the frame 1, and one end of the shaft is provided with a fixed eccentric 11, around which the eccentric strap 12 is positioned. This strap is connected with a rod 13, which, in turn, has its outer end pivotally connected as at 14 with the upper portion of an oscillatory die holder 15.

The holder 15 is, in this instance, of angular formation and has its lower end pivoted as at 16 upon the frame 1, in order that the holder as a whole may oscillate about the horizontal axis provided by the pivotal connection 16. It will be appreciated that by the application of power to the shaft 3, motion will be imparted to the shaft 9 through the instrumentality of the gearing 7 and 8, and thence by way of the eccentric construction 11 and 12 to the holder 15, which in turn is oscillated to an extent governed by the throw of the eccentric construction. The outer end of the holder 15 is provided with a recess 17 which has a ledge 18 projecting thereover. The wall of the recess 17 is provided with depressions in which are seated the upper ends of a pair of slightly spaced substantially vertically disposed die members 19. These members are provided at their upper ends with rounded portions which are seated within the said depressions and are adapted to be maintained therein in a firm and positive manner by means of a cleat 20. This cleat has its ends provided with openings through which bolts or other securing devices 21 are adapted to pass, the said bolts being threaded within registering openings provided in the holder 15. By tightening the nuts 22 carried by the bolts, it will be manifest that the cleat may be brought into firm frictional engagement with the upper ends of the die members so that the latter will be maintained immovable in the holder. The ledge 18 is provided with openings in which are threaded set screws 23, the set screws being disposed to engage with the upper ends of the die members, in order that the latter may be provided with a vertical adjustment. The lower portions of the die members are reduced in thickness as compared with the upper portions thereof, in order that said lower ends will be substantially semicircular in cross section, and the spur forming edges 24 of said members are slightly spaced a distance not to exceed the diameter of the fastening device upon which the said members are adapted to operate. As will be hereinafter explained, the oscillation of the holder 15 will cause the edges 24 of the die members to engage with the round shank of a securing device in order that spurs will be punched out of the material forming said shank, the mounting for the die members 19 being such as to allow for slight relative spreading movement on the part of the die members when the latter engages with a securing device, in order that said die members will be prevented from becoming fractured and also to enable the same to resiliently grip the shank portions of such devices.

As shown in Figure 4, the porcelain knobs which are handled by the machine, are of the type commonly found for retaining ordinary electrical conductors, and to insulate such conductors from adjacent surfaces. These knobs, designated generally by the numeral 25, consist of separable base and cap sections 26 and 27 respectively, the said sections being preferably formed from porcelain, or some other insulating material and are provided with axially extending openings through which headed securing devices such for example as ordinary nails are adapted to pass. In recent years, it has been customary to provide projections of some nature on the shanks of the nails beneath the base section, in order that while the sections will be permitted to be relatively separate to permit of the inserting of wires therebetween, yet the said sections cannot move a sufficient distance on the securing devices to be wholly separated. This feature admits of considerable convenience in handling the knobs by enabling the same to remain at all times in assembled formation and to be therefore instantly ready for use. The shanks 28 of the securing devices are preferably formed with integral offset spurs 29, which project laterally from the shanks of the nails 30 a distance exceeding the diameter of the bore through the sections 26 and 27, and by being so formed and located, the said spurs will effectively serve to prevent removal of the nails from the knobs. By the provision of the present invention, a machine is provided whereby the spurs 29 may be quickly, economically and conveniently produced upon the nails or devices 30 in a substantially automatic manner and without physical injury to the operator.

This is accomplished, primarily, by providing the frame 1 at one end with an inclined table or shelf 31, which is suitably secured in connection with the bed 1 and, as shown in Figure 4, is provided with an inclined upper surface 32, which slopes toward an upstanding longitudinally extending rib 33 formed contiguous to one edge of the table, a longitudinally extending groove 34 being provided between the surface 32 and the rib 33. It will be manifest that by virtue of this construction, the knobs may be placed in any desired quantity longitudinally upon the table 31, so that the base sections will engage with the rib 33. By the inclined surface 32, it is not necessary that strict care should be exercised in placing the knobs upon the table, since by reason of said surface the knobs will automatically gravitate into engagement with the rib. Then the groove 34 is provided in order that the knobs may rotate upon the table when responding to the influence of gravity. It will be apparent that the only care the operator need exercise in placing the knobs on the table is that which is required in locating the knob so that the nails 30 will have their pointed ends projecting toward or over the rib 33. The knobs when placed on the table respond to the influence of gravity and rotate toward the lower end of said table, and this movement on the part of the knobs is arrested and regulated by means of an adjustable stop member 35, carried by the bed 1 and situated at the lower end of the table. This stop member consists of a rod 36, which includes a weakened intermediate portion 37, and an eccentric bearing portion 38, the latter having its outer end threaded to receive a binding nut 39. Since the portion 38 is located eccentrically with respect to the knob engaging portion of the stop member, it will be manifest that by rotating said member in the bearing opening provided therefor in the frame 1, the relationship between the knob engaging portion of the member and the end of the table 31 may be varied, in order that the knobs may be stopped at various positions with respect to the lower end of the table. The stoppage of the knobs is regulated so that the shanks of the nails 30 thereof will be situated in registration with an anvil element 40. This element is preferably formed from a suitably hardened steel and, as shown in Figure 6, includes an enlarged head 41 and a reduced stub portion 42, which is adapted to be received within a socket 43 provided in the frame. The head 41 thereof is formed to include a substantially V shaped groove 44, and the stop member is capable of being positioned so that the shanks of the nails, carried by the knobs 25, will be positioned in registration with the groove 44 of the anvil element. The holder 15 is pivotally mounted in such manner that upon the oscillation thereof, the lower ends of the die members 19 will be positioned so that the same will register with the head of the anvil element, whereby when the holder is rocked, the spaced edges of the die members thereof will be forced into engagement with the shank of a nail positioned upon the anvil so that the offset spurs 29 will be produced on the nail. During the formation of the spurs, the die members will be resiliently spread a slight distance so that the same will grip the shank of the nail between the same. Therefore, when the holder begins to return to its initial position, the knob associated with the nail will be lifted from the table 31 so as to clear the stop member 35. This removal of the spur provided knob from the table permits the remaining knobs on said table to gravitate downwardly so that a new knob may be positioned in registration with the anvil, as will be clearly understood.

To release the knob from engagement with the rearwardly travelling die members, the present construction includes a stationary shelf or other stationary abutment 45, which is removably bolted as at 46 to the bed 1. The shelf or abutment 45 is positioned on a horizontal plane above the stop member 35 and is so located that as the die members revolve rearwardly, the knob gripped thereby will engage the stationary shelf 45, permitting of slight longitudinal travel on the part of the knob. Since the die members are rotating upwardly, it will be apparent that the engagement of the knob with the shelf 45 will result in causing the die members to release the shank of the nail gripped thereby, thus permitting the knob to drop into the discharge opening 47 provided in conjunction with the bed 1. I have found it desirable to place a conveyor 48 beneath the opening 47 in order to receive the discharged knobs, and to permit the same to be conveyed to the position whereby the same may be conveniently collected. The shelf 45 includes an upstanding angle guard 49, which serves to encase substantially the holder 15 and thereby prevents the operator of the machine from being harmed or personally injured by the operation of the holder.

From the foregoing description taken in conjunction with the accompanying drawings, it will be apparent that the present invention provides a machine which will be substantially automatic in its operation and capable of producing the desired spurs upon the shanks of the nails in a quick and economical manner and without injury to the products handled thereby. That is to say, the nails will not be bent, nor will the knob sections be broken, chipped or damaged in any respect. It will be noted that the inclined table, which is arranged to support and feed the knobs into an operating position under the dies, has its upper surface inclined as at 32 which cooperates with the longitudinally extending rib 33. This rib is essential to the proper positioning of the nails with respect to the table, but does not insure successful operation alone, this essential point being covered by the inclined upper surface of the magazine or supporting table, acting in conjunction with the lengthwise extending rib, thus making possible an orderly arrangement and a smooth, uniform and regular feed of the porcelain knobs. It will be noted that the extreme lower end of the table is provided with a flat surface 50 which is disposed at a right angle to the dies. The provision of this surface 50 is very essential as it provides means to eliminate the bending of the nails while in an operative position between the dies and the anvil element, without the necessity of resorting to the more complicated type of machine. It will be observed that the bar or rod 36 serves as an adjustable device for positioning the nails properly under the dies. The adjustment provided thereby serves to compensate for the wear occasioned by contact of the hard porcelain knobs and serves to insure a proper centering of the nails with the anvil element. It will be noted that the dies are constrained to travel in a path corresponding to the arc of a circle. As motion is applied, the movable dies will be swung forwardly into engagement with the nails and the pressure exerted on the dies by this operation slightly expands the same. The pressure tending to expand the dies is absorbed by the nail to an extent that makes it possible to overcome the friction and weight of the knobs above and adjacent to the one operated upon, and therefore, upon the return travel of the dies, the nail adheres thereto and is carried in a path corresponding to the arc of a circle. As the nail and the knob sections supported thereby are carried up by the gripping action of the dies, the weight of the knobs above propels or feeds the one adjacent into an operative position, slightly under the knob attached to the dies, which upon a further movement on the part of the die supporting structure will bring the nail into contact with a combined guard and stripper, which has a slot 51 arranged to permit of movement therethrough on the part of the dies, but arrests or stops the travel of the nail and the porcelain sections. It will be observed, therefore, that the porcelain sections of the knob will not be initially engaged by the stripper surface 45, but that the nail comes into direct contact with said stripper, thus preventing injury to the porcelain sections. As the nail is no longer in contact or propelled by the dies, the knob falls by the action of gravity through the discharge opening 47, or into the position located past the center of the knob adjacent and in an operative position with respect to the dies. This construction makes possible a particular method of removing the knobs from the table and to permit of the discharge of the same from the machine, and the operation of gravity will insure that the assembled product falls or is ejected clear and without interference of all parts of the machine. Proper timing of the knobs containing the nails, as they are brought into an operative position under the dies, is controlled by gravity and thus becomes an automatic feed, permitting of a high rate of speed on the part of the operator, who is relieved of the necessity of timing his movements to correspond with the timing of the other parts of the machine.

What is claimed is:

1. In a machine of the character described, a frame, an oscillatory tool holder carried by said frame, means for oscillating said holder, a pair of die members arranged to be carried by said holder, and means for automatically feeding the securing devices of insulating knobs into the machine in a position to cause the securing devices to be gripped between said die members.

2. In a machine of the character described, a frame, an oscillatory die holder carried by said frame, means for effecting the oscillation of said holder, a pair of die members carried by said holder, an inclined knob supporting table and means situated at one end of said table for effecting the registration of the securing devices of insulator knobs with said die members.

3. In a machine of the character described, a bed frame, a pivoted die holder carried by said frame, a pair of dies connected with said holder, means for automatically feeding insulating knobs into said machine so that the securing devices of said knobs will register with said die members in order that said devices will be gripped between said members, and means for releasing the securing devices from said members to discharge the devices from the machine.

4. In a spur forming machine, an oscillatory die holder, means for oscillating said holder, a pair of parallel die members rigidly carried by said holder, an inclined supporting table capable of receiving insulator knobs, means cooperative with said table for registering the securing devices of said knobs successively with said die members, and means for effecting the discharge of the knobs from said table after being engaged by said die members.

5. In a spur forming machine, an oscillatory die holder, a pair of spur forming dies mounted in conjunction with said holder, an inclined table capable of receiving a plurality of insulator knobs, and means situated in cooperation with said table for arresting the travel of said knobs thereon and to register the securing devices of said knobs with said die members.

6. In a spur forming machine, a frame, an oscillatory die holder movably mounted in conjunction with said frame, means for imparting movement to said holder, a pair of parallel die members mounted in connection with said die holder, an inclined feeding table capable of receiving a plurality of insulator knobs, means situated at one end of said table for engaging with the lowermost of said knobs thereon to position the securing devices of said knobs in the path of movement of said die members, and an anvil element serving to provide a rest for said securing devices when the latter are engaged by said die members.

7. In a spur forming machine, a frame, a movable die holder connected with said frame, means for imparting motion to said holder, a pair of die members carried by said holder, an inclined magazine table capable of receiving a plurality of insulator knobs, a stop member situated at the lower end of said table and capable of arresting the movement of said knobs in order to locate the securing devices thereof in the path of movement of said dies, and means for varying the positions of said stop member to compensate for the effects of wear thereon.

8. In a spur forming machine, a movable die holder, a pair of die members movable in conjunction with said holder, means for automatically feeding the securing devices of insulator knobs into engagement with said die members to produce spurs upon the shanks of said devices, said die members being capable of relative expanding movement when forced into engagement with said securing devices, and means for supporting the shank ends of said devices when the latter are engaged by said die members.

9. In a spur forming machine, a movable die holder, a pair of parallel die members carried by said holder, an inclined table capable of receiving a plurality of insulator knobs through which centrally located securing devices are adapted to pass, means for maintaining said knobs in engagement with one edge of said table, and means situated at the lower end of said table and serving to position the securing devices of said knobs in the path of movement of said die members.

10. In a spur forming machine, a movable die structure, an inclined supporting table capable of receiving a plurality of insulator knobs, a rib extending longitudinally of said table, means formed with said table for maintaining said knobs in engagement with said rib, and means located at the lower end of said table and serving to arrest movement on the part of said knobs to successively center the securing devices of said knobs in the path of movement of said die structure.

11. In a spur forming machine, a movable die structure including a pair of oscillatory die members, an inclined table capable of receiving a plurality of insulator knobs having centrally disposed fastening devices passing therethrough, means for successively presenting the securing devices of each of said knobs to the action of said die members, whereby spurs will be produced upon said devices, said die members serving to frictionally grip said devices during the spur forming operation, whereby the knobs will be caused to travel in unison with said die structure upon the return of the latter to an initial position, and a stripping device capable of engaging a portion of said knobs to release the latter from engagement with said die members.

12. In a spur forming machine, a movable die structure including a pair of spaced parallel die members, an inclined table capable of supporting a plurality of insulator knobs carrying centrally disposed fastening devices, a stop member situated at one end of said table and operating to arrest gravitational travel on the part of said knobs to register the securing devices thereof successively with said die members, said members serving to produce spurs upon the shanks of said devices and to frictionally grip the latter, and a stripping device disposed in the path of movement of said knobs during the movement of the latter in unison with the die structure and operating to effect the release of said knobs and to discharge the same from the machine.

13. In a spur forming machine, an oscillatory die holder, means for effecting oscillation on the part of the die holder, a pair of die members rigidly carried by said holder, said members including relatively spaced cutting ends, a feeding mechanism capable of delivering the fastening devices of insulator knobs into said machine so that the shanks of said devices will be presented to the action of the cutting ends of said die members, whereby said die members will operate to produce spurs upon said devices and to frictionally grip the latter, and means disposed in the path of movement of said knobs during the travel of the latter in conjunction with said die members to release said knobs and to discharge the same from the machine.

14. In a spur forming machine, a frame, a movable die structure carried in conjunction with the frame, an inclined feeding table capable of receiving a plurality of insulator knobs carrying centrally disposed fastening devices, a rib extending longitudinally of said table, the upper surface of said table being inclined in such manner as to maintain certain of the ends of said knobs in engagement with said rib, and a stop member situated at the lower end of said table and capable of presenting the securing devices of said knobs to the action of the die structure.

15. In a spur forming machine, a frame, a movable die structure carried by the frame, an inclined feeding table capable of receiving a plurality of insulator knobs carrying centrally disposed securing devices, a rib extending longitudinally of said table, the upper surface of said table being formed with an inclined surface tending to direct certain of the edges of said knobs towards said rib, said table being further formed with a groove between the rib and the inclined upper surface thereof, and a stop member situated at the lower end of said table and capable of arresting movement on the part of said knobs to center the securing devices thereof in the path of movement of said die structure.

16. In a spur forming machine, a frame, a traveling die structure mounted in conjunction with the frame, an inclined table capable of receiving a plurality of insulator knobs carrying centrally disposed securing devices, a rib extending longitudinally of said table, the upper surface of said table being inclined in the direction of said rib to maintain the knobs in engagement with the rib, means disposed at one end of said table for arresting movement on the part of the knobs to present the shanks of the securing devices thereof to the action of the die structure, the said table having the lower end thereof contiguous to the stop means provided with a flat surface, said latter surface acting to present the shanks of the securing devices to the action of the die structure without incurring bending on the part of said devices.

17. In a spur forming machine, a frame, a travelling die structure carried by said frame, an inclined table supported in connection with said frame, said table being adapted to receive a plurality of insulator knobs carrying centrally disposed fastening devices, an adjustable rod member situated at one end of said table and serving to arrest gravitational travel on the part of said knobs to present the securing devices thereof to the spur producing action of said die structure, and means for adjusting said rod member to compensate for the effects of wear.

18. In a spur forming machine, a frame, an oscillatory die holder pivotally carried by said frame, means for oscillating said holder, a pair of parallel die members clamped to said holder, an inclined table capable of receiving porcelain insulator knobs carrying centrally disposed mechanical securing devices, a stop member situated at one end of said table and operating to arrest travel on the part of said knobs to align the shank ends of the securing devices thereof with said die members, and a removable anvil element having a groove formed therein for the reception of said securing devices when the latter are engaged by said die members.

In testimony whereof I affix my signature.

OSCAR W. McKNIGHT.